United States Patent [19]

Von Gentzkow et al.

[11] Patent Number: 4,638,019
[45] Date of Patent: Jan. 20, 1987

[54] METHOD FOR RADICAL CROSS-LINKING OF ORGANIC POLYMERS

[75] Inventors: Wolfgang Von Gentzkow, Kleinsendelbach; Helmut Markert, Nürnberg; Hans Hauschildt, Erlangen; Manfred Schmiedel, Nürnberg-Grossgründlach, all of Fed. Rep. of Germany

[73] Assignee: Siemens Aktiengesellschaft, Munich, Fed. Rep. of Germany

[21] Appl. No.: 585,250

[22] Filed: Mar. 1, 1984

[30] Foreign Application Priority Data

Mar. 2, 1983 [DE] Fed. Rep. of Germany ....... 3307408

[51] Int. Cl.$^4$ ..................................... C08J 3/24/3/28
[52] U.S. Cl. ................................... 522/104; 522/106; 525/166; 525/168; 525/169; 525/170; 525/171; 525/193; 525/275; 525/305; 525/306; 525/307; 525/921
[58] Field of Search ............... 525/305, 306, 921, 168, 525/43, 193, 307, 275, 166, 169, 171; 522/106, 104

[56] References Cited

U.S. PATENT DOCUMENTS 2,280,242  4/1942  Kropa et al. .......................... 525/43
3,652,733  3/1972  Davenport .................... 204/159.17
4,101,493  7/1978  Nakagawa et al. ............ 204/159.17

*Primary Examiner*—Wilbert J. Briggs, Sr.
*Attorney, Agent, or Firm*—Kenyon & Kenyon

[57] ABSTRACT

A method for radical cross-linking or organic polymers, is disclosed which uses a cross-linking enhancer of the following formula

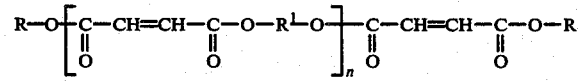

wherein
  R is alkenyl or alkynyl;
  $R^1$ is alkylene, alkenylene, alkynylene or $-(R^2-O)_m-R^2-$, $R^2$ is $CH_2$, $(CH_2)_2$, $(CH_2)_3$ or $CH_2-CH(CH_3)$, and m is 1 to 50; and n is 1 to 10.

6 Claims, 3 Drawing Figures

METHOD FOR RADICAL CROSS-LINKING OF ORGANIC POLYMERS

BACKGROUND OF THE INVENTION

The invention relates to a method for radical cross-linking of organic polymers in the presence of cross-linking enhancers.

Radically cross-linked polymers have attained increasing technical importance in recent years. The comparatively low prices of the thermoplastic and elastomer polymers which are mostly available on a large technical scale and are readily processable, especially of polyolefins, is appealing. The cross-linking process can be carried out in a technically relatively simple and cost-effective manner, especially for elongated materials such as cable and wire insulation, tubing and housing. The thermal-mechanical spectrum of properties of cross-linked polymers is substantially improved which makes possible an expansion of the field of application to temperatures above the softening range of thermoplastic polymers.

In radical cross linking, radicals, which react with each other to form cross-linked, bridges, are generated in the polymers. The radicals can be generated either through the thermal decomposition of labile chemical compounds such as organic peroxides, which are mixed into the polymers prior to the cross-linking process, or by irradiation of the polymers with high-energy rays, especially with accelerated electrons. While the peroxidic cross-linking has been practiced technically in the form of various processes for a long time, the technical advance of radiation cross-linking is still relatively recent and is still under development, especially in the cross-linking of thick-walled materials such as medium-voltage insulation of polyethylene.

The goal of all cross-linking processes is cost-effective, homogeneous cross-linking which is as fast as possible and is gentle on the material. For this purpose, so-called cross-linking enhancers are often added to polymers to be cross-linked. The known cross-linking enhancers increase the yield at cross-linking points or reduce the radiation dose or peroxide concentration required for attaining the required degree of cross-linking; however, the exact operation of cross-linking enhancers has not yet been determined.

It is important to use cross-linking enhancers, for instance, in the radiation cross-linking of polyvinylchloride (PVC) and in the pressure-less peroxidic cross-linking of polyethylene in a salt bath. Due to its radiation sensitivity PVC, which has a greater tendency toward polymer decomposition than toward cross-linking, cannot be cross-linked without a cross-linking enhancer. For pressure-less cross-linking in the salt bath, cross-linking enhancers accelerate the cross-linking process and prevent the formation of pores by gaseous decomposition products of the peroxide.

The use of cross-linking enhancers is also important in the radiation cross-linking of medium-voltage insulation or thick-walled tubes of polyethylene. During the radiation cross-linking hydrogen and heat are generated during the irradiation proportionally to the radiation dose, for example, with a dose of about 250 kGy required for sufficient cross-linking of stabilized polyethylene of low density (LDPE): a considerable quantity of gas; in the adiabatic case, a temperature increase in the polymer of about 100° C. Since with the technically desired high production speeds, the heat cannot be removed sufficiently fast in the customary technology, the unavoidable result is therefore damage to the polymer material through pore formation. Using cross-linking enhancers, the dose required for cross-linking high-pressure polyethylenes can now be lowered to about 150 kGy or to even lower doses, whereby the development of heat as well as of gas can be reduced to non-damaging values.

In addition to the requirement of very high effectiveness, technically usable cross-linking enhancers must meet a multitude of further production-related requirements. Since they have to be mixed into the polymer and homogeneously distributed therein prior to the shaping, for instance, by extrusion, they should be highly polymer-compatible or polymer-soluble and should be thermally stable particularly for the shaping process which takes place at temperatures of up to 200° C. In addition, the cross-linking enhancers should not evaporate during the shaping nor during the intermediate storage of the shaped material up to the cross-linking (off-line production), i.e., they must be as non-volatile as possible. In addition, the cross-linking enhancers should not have a negative effect on the properties which are important for the technical application of the polymer product. One cross-linking enhancer which is frequently employed on a technical scale is triallyl cyanurate (TAC). However, also other products such as dipropargyl maleate (DPM), dipropargyl succinate (DPS) or triallyl mellitate (TATM) are recommended for technical use (see, for instance, U.S. Pat. No. 4,113,595).

In spite of the large number of known cross-linking enhancers, no enhancers have as yet been developed which are highly effective and at the same time meet sufficiently the foregoing production-related requirements. Of the enhancers investigated most thoroughly including the acrylates and methacrylates, allyl compounds, propynyl compounds and maleinimides, while sufficiently effective as cross-linking enhancers, are relatively incompatible with polymers and are highly volatile. The maleinimides moreover are thermally unstable and cause incipient cross-linking of polyolefins at temperatures between 150° and 200° C. In the peroxidic cross-linking of polyolefins, losses of cross-linking enhancers can further occur due to insufficient polymer compatibility and excessive volatility. While these losses can be compensated by overdosing, the manufactured product thereby becomes more expensive.

It is an object of the invention, therefore to develop a process for radical cross-linking of organic polymers in the presence of cross-linking enhancers which meet the foregoing production-related requirements.

SUMMARY OF THE INVENTION

This and other objectives are achieved, according to the invention, by the use of an oligomeric ester as a cross-linking enhancer in a process for radical cross-linking an organic polymer which process with the oligomeric ester is carried out in the absence of polythiol. The oligomeric ester has formula I as shown:

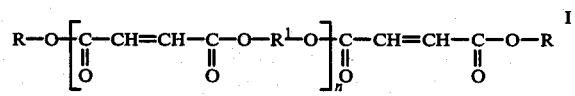

wherein

R is alkenyl or alkynyl;
R$^1$ is alkylene, alkenylene, alkynylene or —(R$^2$—O)$_m$—R$^2$—, with
R$^2$ being $CH_2$, $(CH_2)_2$, $(CH_2)_3$ or $CH_2$—$CH(CH_3)$, m is 1 to 50; and n is 1 to 10.

BRIEF DESCRIPTION OF THE DRAWING

The figures illustrate the production of cross-linking according to the invention.

DETAILED DESCRIPTION OF THE INVENTION

Figure 1:
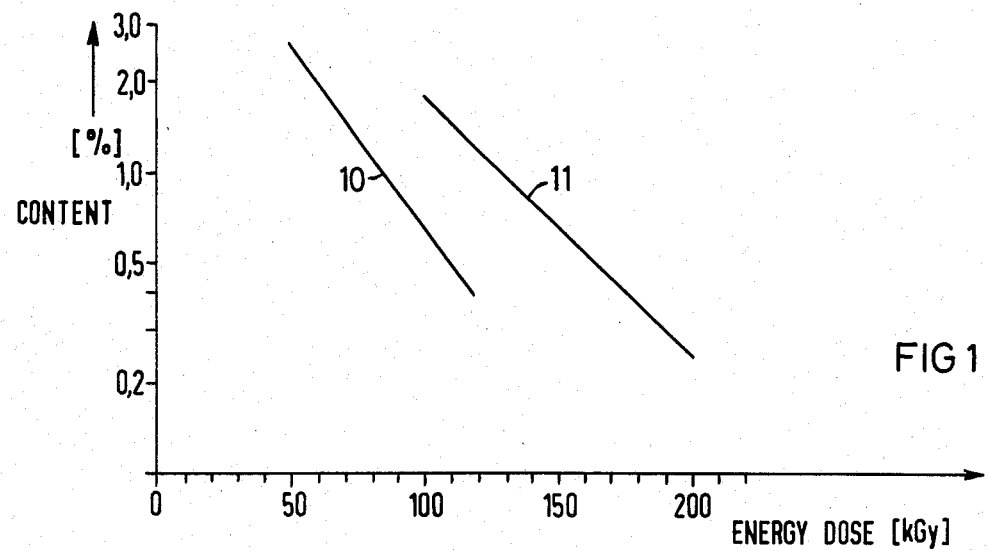
FIG. 1 shows the relationship between the mass content and the energy dose.

The cross-linking enhancers used in the process according to the invention, which can be employed singly or as mixtures, are, in the chemical sense, oligomeric esters of maleic acid or fumaric acid with both unsaturated aliphatic alcohols and saturated or unsaturated diols. Such cross-linking enhancers have the advantage that they show an improvement in polymer compatibility compared with the enhancer products previously used. They also show greatly reduced volatility, excellent cross-linking enhancement effectiveness with simultaneous, sufficient thermal stability even at high mixing and extrusion temperatures, and have no detrimental effect on the properties required for the technical application of the polymers, for instance, of polyolefins in cable and wire insulation, tubing and hoses. The oligomeric esters used according to the invention are predominantly liquid and can be worked into the polymers by methods familiar to those in the art.

The process according to the invention is suitable for peroxide cross-linking as well as for radiation cross-linking of polymers and is carried out in the absence of polythiol. Advantageously, 0.1 to 10 weight percent, relative to the polymer, of cross-linking enhancer is used, and preferably 0.5 to 5 mass percent. Of the cross-linking enhancers, those preferred have R of Formula I as an alkynyl and R$^1$ as an alkylene radical.

In the process according to the invention, the following organic polymers are used preferably:
1. Polyolefins which as homo- or copolymers of ethylene, propene, but-1-ene, isobutene and derivatives thereof;
2. Copolymers of ethylene with vinyl acetate, ethyl acrylate or butyl acrylate;
3. Terpolymers which are obtained by polymerization of ethylene with propene in the presence of unconjugated dienes, especially dicyclopentadiene, hexadiene and ethylidenyl norbornene (i.e. bicyclo[2.2.1]hept-2-ene);
4. Mixtures of polyolefins or with polyolefins as the essential components, especially mixtures of the above-mentioned homo-, co- and terpolymers with each other or with polyvinylchloride, silicone rubber, polyurethanes, polyphenylene oxide, chlorinated polyolefins or fluorine-containing polymers;
5. Block copolymers, especially of styrene, ethylene, propene and butene; and
6. Natural and synthetic rubbers.

However, other polymers such as polyphenylene oxides, polyvinylchloride, polyvinylidene fluoride, copolymers of ethylene and halogen-containing olefins as well as unsaturated polyesters and polyurethanes can advantageously be used in this method. The cross-linking enhancers are introduced into the organic polymers prior to the cross-linking process.

The organic polymers, cross-linked and prepared in accordance with the method of the invention are advantageously suited for cable and wire insulation as well as for tubing and hosing, and as jacket materials and as shrinkable materials, for instance, for bushing and joint techniques. For use as cable and wire insulation, the medium-voltage range is of particular interest. Here, radiation cross-linking of polyolefins, such as polyethylene and ethylene-propene-diene terpolymers are in the foregoing.

The invention will be explained in further detail with the aid of the following examples.

Oligomeric Ester Preparation

The oligomeric esters used in the method of the invention can be obtained by two different ways: either by the addition of a monofunctional aliphatic alcohol (R-OH) to maleic acid anhydride and subsequent esterification of the free carboxyl group with an aliphatic diol (HO-R-OH) or by the addition of a diol to two molecules of maleic acid anhydride and subsequent esterification of the free carboxyl groups with a monofunctional alcohol. In both cases, oligomeric products are obtained in the esterification reaction by partial transesterification. The addition as well as the esterification reaction is carried out in the presence of catalysts. In the esterification, cis/trans-isomerisation of the products of the maleic acid into products of fumaric acid can occur, especially under the action of acids.

In Table 1, a number of compounds are listed which can be prepared in the described manner and can be used as cross-linking enhancers in the method according to the invention. Besides the definition of R and R$^1$ (see the above formula), also the mean degree of oligomerization ($\bar{n}$) of the individual compounds is given. All the compounds contained in Table 1 are viscous at room temperature and most of these compounds are slightly colored (yellowish or brownish). In the compounds used in the method according to the invention, the numeric value for m is preferably 1 to 20.

TABLE 1

| Nr. | R | R$^1$ | $\bar{n}$ |
|---|---|---|---|
| 1a | HC≡C—$CH_2$— | —$CH_2$—$C(CH_3)_2$—$CH_2$— | 1 |
| 1b | HC≡C—$CH_2$— | —$CH_2$—$C(CH_3)_2$—$CH_2$— | 2,8 |
| 2a | HC≡C—$CH_2$— | —$CH_2$—$CH_2$— | 1,8 |
| 2b | HC≡C—$CH_2$— | —$CH_2$—$CH_2$— | 3,8 |
| 3 | HC≡C—$CH_2$— | $-\!\!\!+\!CH_2$—$CH_2$—O$\!+_m\!CH_2$—$CH_2$—; m = 4 | 1,6 |
| 4 | HC≡C—$CH_2$— | $-\!\!\!+\!CH_2$—$CH_2$—O$\!+_m\!CH_2$—$CH_2$—; m = 6 | 1,5 |
| 5 | HC≡C—$CH_2$— | $-\!\!\!+\!CH_2$—$CH_2$—O$\!+_m\!CH_2$—$CH_2$—; m = 9 | 1,3 |
| 6 | HC≡C—$CH_2$ | —$(CH_2)_{12}$— | 1,7 |
| 7 | HC≡C—$CH_2$— | —$CH_2$—C≡C—$CH_2$— | 3,1 |
| 8 | $H_2$C=CH—$CH_2$— | —$CH_2$—C≡C—$CH_2$— | 2,8 |
| 9 | $H_3$C—C≡C—$CH_2$—$CH_2$— | —$CH_2$—$C(CH_3)_2$—$CH_2$— | 3,2 |

TABLE 1-continued

| Nr. | R | R[1] | $\bar{n}$ |
|---|---|---|---|
| 10 | HC≡C—CH—CH$_3$ | —CH$_2$—C(CH$_3$)$_2$—CH$_2$— | 3,2 |
| 11 | H$_2$C=C(CH$_3$)—CH$_2$— | —CH$_2$—C(CH$_3$)$_2$—CH$_2$— | 3,1 |
| 12 | H$_2$C=CH—CH$_2$— | —CH$_2$—CH=CH—CH$_2$— | 1,4 |
| 13 | H$_2$C=CH—CH$_2$— | —CH$_2$—C(CH$_3$)$_2$—CH$_2$— | 1,6 |
| 14 | H$_2$C=CH—CH$_2$— | —CH$_2$—CH$_2$— | 3,1 |
| 15 | HC≡C—CH$_2$— | —CH$_2$—CH=CH—CH$_2$— | 2,8 |
| 16 | HC≡C—CH$_2$—CH$_2$— | —CH$_2$—C(CH$_3$)$_2$—CH$_2$— | 2,9 |

EXAMPLE 1

A selected amount in mass parts (the selected amount is 100 minus X, wherein X corresponds to the selected value for the enhancer given in Table 2) of high-pressure polyethylene LDPE (d=0.918 g/cm$^3$; MFI 190/2=0.2) are filled, together with the selected amount (X) in mass parts of a cross-linking enhancer (enhancer taken from Table 1) (in a sealed polyethylene capsule) into a laboratory kneader heated to 150° C. and plasticized and homogenized with the kneader closed; the mixture is then ground by cooling down the kneader while the kneading shafts are running. Through this mode of operation, additive losses are prevented. One mm sheets are pressed at 180° C. from the mixture which is present in granular form and are cross-linked by means of a 2-MV Van de Graaff electron accelerator with electron beams of different doses (dose rate: 1 kGy/s). In order to characterize the cross-linked polymer and determine the prevailing cross-linking yield, the percent cross-linking is determined by finding the insoluble gel content. For this purpose cubes with a side length of 1 mm are made from the pressed plate, are weighed, extracted for 12 hours with boiling mixture of xylenes and weighed again after drying in a vacuum.

Table 2 contains the gel values found for different concentrations of different cross-linking enhancers VV after irridation with different radiation doses. A comparison with similarly treated polyethylene without additions and a polyethylene sample with the known cross-linking enhancer triallylcyanurate (TAC) shows the high effectiveness of the compounds employed according to the invention. The dose D also given in Table 2 characterizes the radiation dose required for technically sufficient cross-linking.

In FIG. 1, the relationship between the radiation dose and the mass content (i.e., content in mass percent) of the cross-linking enhancer is shown by the example of the compound 1b and of TAC for technically sufficient cross linking (100% elongation after 30 minutes at 200° C. with 20 N/cm2). It is found that the cross-linking enhancer according to the invention (curve 10) has an effectiveness greatly improved over the known cross-linking enhancer (curve 11).

TABLE 2

| VV | Mass parts X | Gel values (%) after irradiation with | | | | | Dose D kGy |
|---|---|---|---|---|---|---|---|
| | | 40 kGy | 80 kGy | 120 kGy | 160 kGy | 200 kGy | |
| — | 0 | 46 | 56 | 64 | 70 | 74 | 200 |
| TAC | 0,75 | 57 | 65 | 72 | 76 | 80 | 150 |
| | 1,25 | 59 | 72 | 75 | 79 | 82 | 120 |
| | 1,75 | 60 | 72 | 78 | 82 | 84 | 100 |
| 1a | 1,0 | 66 | 74 | 79 | 83 | 85 | 80 |
| | 1,9 | 70 | 79 | 83 | 84 | 86 | 60 |
| 1b | 0,4 | 60 | 70 | 74 | 78 | 81 | 120 |
| | 0,8 | 64 | 72 | 78 | 81 | 83 | 90 |
| | 1,2 | 67 | 76 | 80 | 83 | 85 | 80 |
| | 2,0 | 69 | 80 | 83 | 84 | 86 | 60 |
| 2a | 1,7 | 72 | 80 | 84 | 86 | 86 | 50 |
| 2b | 1,0 | 63 | 74 | 79 | 81 | 84 | 80 |
| | 1,7 | 66 | 76 | 80 | 82 | 84 | 70 |
| 3 | 2,4 | 64 | 74 | 76 | 82 | 84 | 80 |
| 4 | 2,9 | 63 | 73 | 76 | 80 | 82 | 90 |
| 5 | 2,9 | 63 | 71 | 74 | 79 | 81 | 120 |
| 6 | 2,0 | 66 | 74 | 80 | 82 | 83 | 80 |
| | 2,4 | 67 | 75 | 81 | 83 | 84 | 70 |
| 7 | 1,0 | 60 | 67 | 73 | 77 | 79 | 120 |
| | 2,0 | 66 | 74 | 80 | 82 | 83 | 80 |

EXAMPLE 2

A selected amount in mass parts of high-pressure polyethylene LDPE (the selected amount is 100 minus (X+Y), wherein X and Y are the selected values for enhancer and peroxide given in Table 3) (d=0.918 g/cm$^3$; MFI 190/2=0.2) are filled together with a selected amount (X) in mass parts of a cross-linking enhancer and a selected amount (Y) in mass parts of the peroxide 1,3-bis(tert.butyl-peroxyisopropyl)benzene, both in a sealed LDPE capsule, into a laboratory kneader heated to 135° C. and are plasticized and homogenized with the kneader closed; the mixture is then comminuted by cooling down the kneader with the kneading shafts running. One mm sheets are then pressed from the mixture present in granular form at 180° C. (pressing time: 15 min.); the cross-linking also takes place then. To characterize the cross-linking yield, the percent cross-linking is determined as described in Example 1.

Table 3 contains the gel values determined for different concentrations of cross-linking enhancers and peroxide. A comparison with polyethylene which was treated in the same way and did not contain cross-linking enhancer, or the known cross-linking enhancer triallylcyanurate (TAC) shows the high cross-linking-enhancing effectiveness of the compounds employed in accordance with the invention.

TABLE 3

| Cross-linking Enhancer | Mass parts X | Peroxide mass parts Y | Gel value after 15 min/180° C. [%] |
|---|---|---|---|
| without | — | 0,3 | 65 |
| | — | 0,5 | 77 |
| | — | 0,7 | 81 |
| | — | 1,2 | 89 |
| TAC | 0,7 | 0,3 | 84 |
| | 0,7 | 0,5 | 86 |
| | 0,7 | 0,7 | 89 |
| | 0,7 | 1,2 | 93 |
| 1b | 0,4 | 0,5 | 84 |
| | 0,6 | 0,5 | 86 |
| | 0,8 | 0,5 | 88 |
| | 1,0 | 0,5 | 90 |
| 2b | 0,7 | 0,5 | 87 |

TABLE 3-continued

| Cross-linking Enhancer | Mass parts X | Peroxide mass parts Y | Gel value after 15 min/180° C. [%] |
|---|---|---|---|
| 3 | 0,7 | 0,5 | 86 |
| 12 | 0,7 | 0,5 | |
| 14 | 0,7 | 0,5 | |

EXAMPLE 3

A selected amount in mass parts (the selected amount is 99.7 minus X, wherein X is the selected value for enhancer given in Table 4) of an ethylene-propylene copolymer (ethylene content: 40 to 45% mass percent; Mooney viscosity ML (1+8 min) at 100° C.: 35 to 45) are filled, together with a selected amount (X) in mass parts of a cross-linking enhancer and 0.3 mass parts of oligomerized 2,2,4-trimethyl-1,2-dihydroquinoline as an oxidation inhibitor, both in a sealed LDPE capsule, into a laboratory kneader heated to 150° C., plasticized with the kneader closed and homogenized for 10 minutes. Thereupon, the mixture is granulated in the kneader by cooling it down to 80° C. From the granulated product, one mm sheets are pressed at 150° C. and cross-linked with electron rays of different doses.

Table 4 contains the gel values determined by extraction. The values show that a low-molecular ethylene-propylene copolymer which can otherwise not be cross-linked or only with difficulty, can be cross-linked sufficiently in the presence of the compounds employed in accordance with the invention.

TABLE 4

| Cross-linking Enhancer | Mass parts X | Gel value (%) after irradiation with | | | | |
|---|---|---|---|---|---|---|
| | | 40 kGy | 80 kGy | 120 kGy | 160 kGy | 200 kGy |
| without | — | 27 | 35 | 41 | 46 | 52 |
| 1b | 1 | 38 | 49 | 56 | 62 | 68 |
| | 2 | 51 | 58 | 66 | 71 | 75 |
| 2b | 2 | 53 | 59 | 68 | 73 | 78 |
| 12 | 2 | 52 | 57 | 67 | 72 | 76 |

EXAMPLE 4

A selected amount in mass parts of an ethylene-propylene block copolymer (the selected amount is 99.7 minus X, wherein X is the selected value for the enhancer given in Table 5) (d=0.90 g/cm³; MFI230/5=1.3; ball pressure hardness=49 N/mm) are filled with a selected amount (X) in mass parts of a cross-linking enhancer and 0.3 mass parts of oligomerized 2,2,4-trimethyl-1,2-dihydroquinoline as an oxidation inhibitor, both in a sealed LDPE capsule, into a laboratory kneader heated to 180° C., plasticized with the kneader closed and homogenized for 10 minutes; in the process, the temperature rises to 190° C. The mixture is comminuted by cooling it to about 120° C. in the kneader. The granulated product obtained in the process is made into one mm sheets by pressing for 2 minutes at 200° C. and is cross-linked with electron rays of different doses.

Table 5 contains the gel values determined by extraction. The values show that the otherwise not cross-linkable block copolymer can be cross-linked sufficiently with 160 kGy in the presence of a cross-linking enhancer employed in accordance with the invention.

TABLE 5

| Cross-linking Enhancer | Mass parts X | Gel value (%) after irradiation with | | | |
|---|---|---|---|---|---|
| | | 40 kGy | 80 kGy | 120 kGy | 160 kGy |
| without | — | 0 | 0 | 0 | 0 |
| 1a | 2,0 | 61 | 67 | 71 | 75 |
| 1b | 2,0 | 60 | 66 | 70 | 74 |
| 2a | 2,0 | 62 | 68 | 72 | 76 |

EXAMPLE 5

1-mm sheets, prepared in a rolling mill at 160° C. of a mixture of
- 47 mass parts PVC
- 32.5 mass parts of a softening mixture
- 10 mass parts kaolin
- 4 mass parts lead phthalate
- 0.6 mass parts lead stearate
- 0.9 mass parts of a mixture of 3 oxidation inhibitors 5 mass parts cross-linking enhancer are cross-linked with electron rays of different doses. Besides the gel values determined by extraction, the thermal elongation at 200° C. is determined by loading with 20 N/mm².

Table 6 contains the gel values and the elongation values. In the case of the elongation values shown in parentheses, the temporary elongation after 15 minutes at 200° C. and after the slash, the permanent elongation at 200° C. after the weight is removed, are given.

TABLE 6

| Cross-linking Enhancer | Gel value (%) (Thermal Elongation (%)) after Irradiation with | | |
|---|---|---|---|
| | 40 kGy | 80 kGy | 120 kGy |
| without | 66 (broke) | 69 (broke) | 72 (broke) |
| TATM | 69 (172/60) | 75 (108/36) | 81 (61/20) |
| TAC | 73 (166/48) | 77 (98/32) | 82 (56/20) |
| 1b | 81 (144/52) | 83 (60/24) | 86 (48/12) |

EXAMPLE 6

In order to judge the volatility of the compounds employed in accordance with the invention and to thereby estimate the losses during processing, they were examined by means of thermogravimetric analysis (heating rate: 10 K/min; nitrogen flow velocity: 100 ml/min).

Table 7 contains the mass of different compounds in percent when 200° C. is reached, referred to the starting mass of each measurement.

Figure 2:
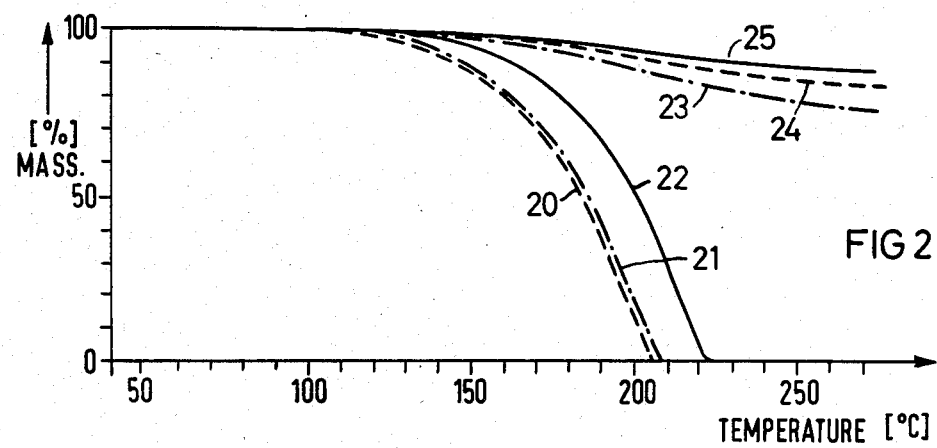
FIG. 2 shows the loss of mass as a function of temperature when several kinds of enhancers are heated.

In FIG. 2, the mass loss of a number of compounds as a function of temperature is shown graphically. The individual curves apply to the following compounds (see Table 7): Curve 20: DPS; curve 21: DPM; curve 22; TAC; curve 23: 1 b; curve 24: 4; curve 25: 5.

TABLE 7

| Cross-linking Enhancer | Mass residue at 200° C. in % |
|---|---|
| 1b | 92,5 |
| 2a | 65,0 |
| 2b | 91,6 |
| 3 | 89,1 |
| 4 | 93,6 |
| 5 | 94,0 |
| 6 | 89,4 |
| 7 | 90,8 |
| 8 | 88,9 |
| 9 | 91,4 |
| 10 | 92,1 |
| 11 | 91,8 |

TABLE 7-continued

| Cross-linking Enhancer | Mass residue at 200° C. in % |
|---|---|
| 12 | 82,6 |
| Dipropargylmaleate (DPM) | 6,5 |
| Dipropargylsuccinate (DPS) | 0,0 |
| Triallyloyanurate (TAC) | 44,0 |
| Diallylidenpentaerythrite | 5,1 |

Table 7 as also FIG. 2 demonstrate the greatly reduced volatility of the cross-linking enhancers according to the invention in comparison with the known cross-linking enhancers.

EXAMPLE 7

In order to judge the polymer compatibility of the compounds employed in accordance with the invention and thereby, the migration losses from the polymer, polymer mixtures of 99 mass parts high-pressure polyethylene (d=0.918 g/cm$^3$; MFI 190/2=0.2) and 1 mass part cross-linking enhancer were prepared (see Example 1) and 0.7 mm sheets were pressed therefrom and stored, not cross-linked, at 30° C. in a drying oven. At certain time intervals, the sheets were checked by IR spectroscopy for the remaining cross-linking enhancer content.

Figure 3:
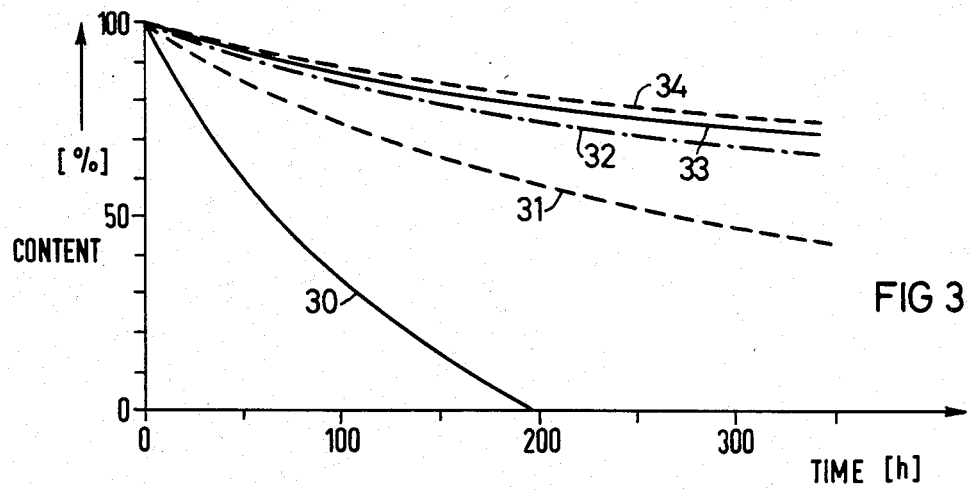
FIG. 3 shows the migration factors of enhancers.

In FIG. 3, the dependence of the migration on the time is graphically shown for different cross-linking enhancers. The following relationship applies: curve 30: dipropargylmaleate (DPM); curve 31: triallylcyanurate (TAC); curve 32; 1b; curve 33; 2b; curve 34: 5.

FIG. 3 shows that the cross-linking enhancers employed in the method according to the invention migrate much less than the known cross-linking enhancers, i.e., the migration losses are lower.

What is claimed is:

1. In a method for radical cross-linking of an organic polymer in the presence of a cross-linking enhancer, the improvement which comprises using as said enhancer an oligomeric ester of the following formula

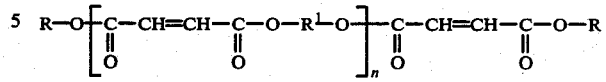

wherein R is alkenyl or alkynyl; R$^1$ is alkylene, alkenylene, alkynylene or —(R$^2$—O)$_m$—R$^2$—, with R$^2$ being CH$_2$, (CH$_2$)$_2$, (CH$_2$)$_3$ or CH$_2$—CH(CH$_3$), and m being 1 to 50; n is 1 to 10; said method is carried out in the absence of polythiol; and the cross-linking enhancer is present in an amount of from 0.1 to 10 mass percent, relative to the weight of the polymer.

2. A method according to claim 1, wherein R is alkynyl and R$^1$ is alkylene.

3. A method according to claim 1 wherein 0.5 to 5 mass percent relative to the polymer, of cross-linking enhancer is used.

4. A method according to claim 1 wherein the organic polymer is a polyolefin.

5. A method according to claim 1 wherein the organic polymer is selected from a homo- or copolymer of ethylene, propene, but-1-ene or isobutene, a copolymer of ethylene with vinyl acetate, ethylacrylate or butylacrylate, a terpolymer prepared from ethylene and propene in the presence of an unconjugated diene, a mixture of one or more of said organic polymers, a mixture of the homo-, co- and terpolymers with each other, or with a polyvinylchloride, a silicone rubber, a polyurethane, a polyphenylene oxide, a chlorinated polyolefin or a fluorine-containing polymer, a block copolymer of styrene, ethylene, propene and butene, or a natural or synthetic rubber.

6. A method according to claim 1 wherein the organic polymer is a polyphenylene oxide, a polyvinylchloride, a polyvinylidene fluoride, a copolymer of ethylene and a halogen-containing olefin or an unsaturated polyester, or a polyurethane.

* * * * *